United States Patent [19]

Jaegtnes

[11] 4,029,122
[45] June 14, 1977

[54] APPARATUS AND METHOD FOR DETERMINING FRICTION FORCES IN POSITION MODULATED VALVES

[75] Inventor: Karl O. Jaegtnes, Chester Heights, Pa.

[73] Assignee: Westinghouse Electric Corporation, Pittsburgh, Pa.

[22] Filed: Mar. 11, 1976

[21] Appl. No.: 665,822

[52] U.S. Cl. .................................. 137/551; 73/9; 91/1; 92/5 R
[51] Int. Cl.² ........................................ F16K 37/00
[58] Field of Search ............... 137/557, 551; 73/9, 73/10; 91/1; 92/5 R

[56] References Cited
UNITED STATES PATENTS 3,675,538  7/1972  Keller et al. ........................... 91/1
3,798,962  3/1974  Dibley et al. ............................ 73/9

Primary Examiner—William R. Cline
Attorney, Agent, or Firm—G. H. Telfer

[57] ABSTRACT

Apparatus and method for indicating whether friction forces within a position modulating valve are approaching a predetermined friction value. The invention includes pressure detectors which monitor the pressure forces required by the valve actuator to move the valve plug predetermined distances toward open and seated positions. Means are provided which generate signal proportional to the difference between opening and seating actuating pressures and which is functionally related to the friction force within the valve. Means for comparing the generated signal to a predetermined reference signal, and for indicating if the generated signal exceeds the reference, are also provided.

4 Claims, 1 Drawing Figure

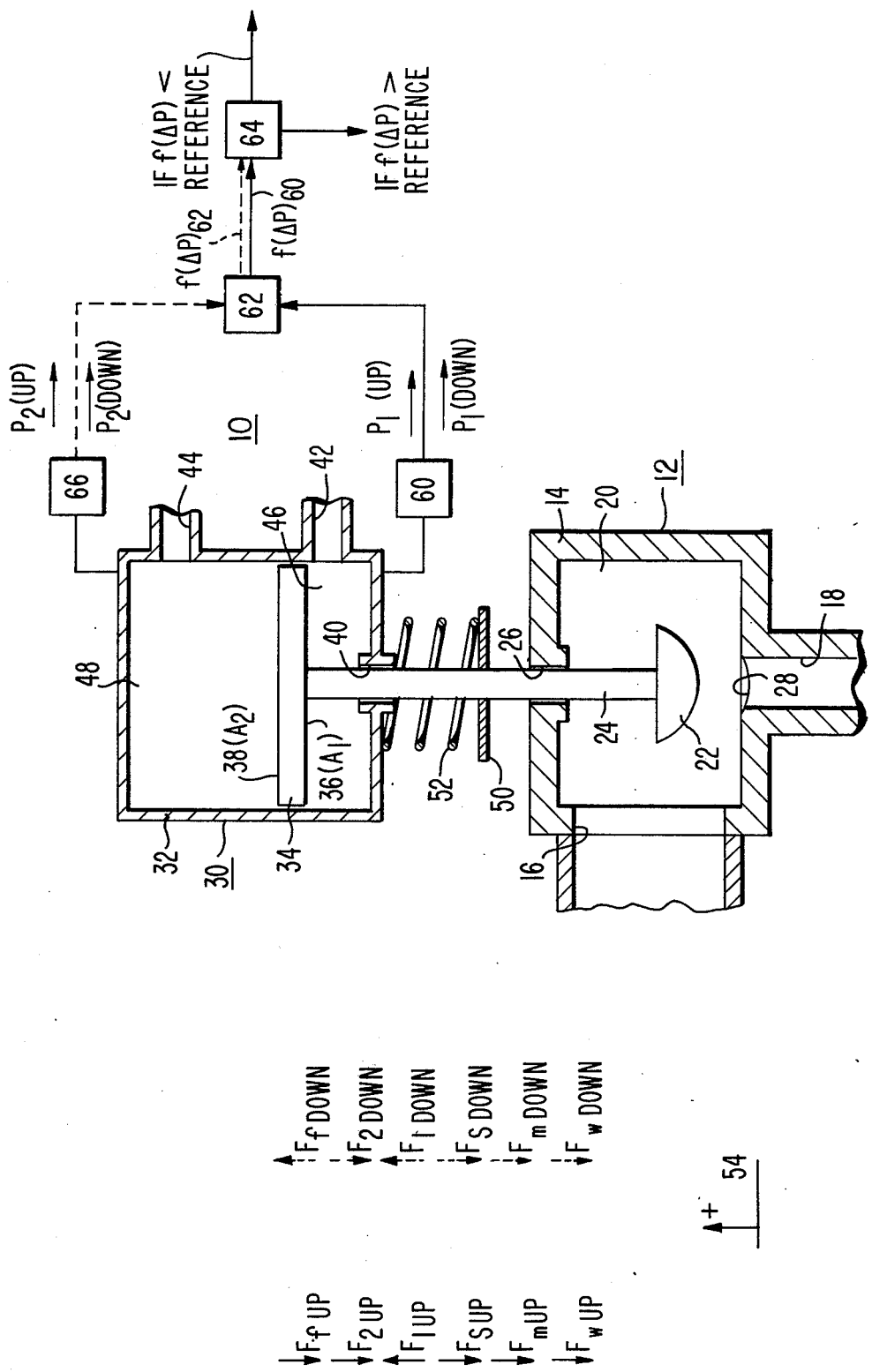

APPARATUS AND METHOD FOR DETERMINING FRICTION FORCES IN POSITION MODULATED VALVES

BACKGROUND OF THE INVENTION

1. Field of the Invention:

This invention relates to position modulated valves, and in particular, to an apparatus and method for detecting whether the friction level within the valve is approaching a condition where a malfunction of the valve is likely to occur.

2. Description of the Prior Art:

As is well known, a steam turbine power plant includes within a closed-loop series arrangement a steam generator element, at least one turbine element, and a condenser element. Steam from the steam generator element is permitted to expand through the turbine, and the energy of the steam is transformed to rotational mechanical energy. The rotational energy is converted into electrical energy by a generator element operatively connected to the system. The exhausted steam from the turbine returns to the liquid state within the condenser element prior to its re-introduction into the steam generator.

Disposed at various locations throughout the power plant are flow control devices which regulate the flow of motive steam within the closed-loop power plant arrangement. Such flow control devices are usually controlled in an integrated manner by an overall power plant control system which takes into consideration, when adjusting the modulating position of each flow control device, such factors as the load imposed upon the plant, the speed at which the rotor shaft is turning and various other system parameters.

One of the system flow control devices is provided intermediate between the steam generator element and the inlet of the turbine apparatus. This flow control device, commonly a position-modulating valve, when provided in such a location is known in the art as the control valve for the turbine. By varying the location of the valve plug relative to the valve seat disposed within the casing of the valve, the volume of motive steam able to pass from the valve inlet (connected to the steam generator) and to the outlet port thereof (and into the turbine element) is precisely regulated. Varying the dimension of the plug away from its associated seat, known as the "lift", varies the volume of motive steam passing into the turbine element. If, for example, during low load conditions imposed upon the power plant as a whole, the flow control device narrows the lift to reduce the volume of motive steam passing into the turbine. Conversely, during periods of peak power demand on the plant, the lift is widened so as to permit greater volumes of motive steam to enter the turbine.

The most common failure of such a position modulating valve, disposed either as the turbine control valve or at any other location within the power plant, is that such flow control devices tend to stick. Such a failure mode is normally attributable to deposits accreting on the valve stems where there exist narrow clearances between that stem or a moving part associated therewith and the valve casing. Of course, if the deposits of clogging elements accumulate to a sufficient magnitude, the control valve plug is unable to move, and its position modulating function is totally vitiated.

Incipient failures of this type may be normally detected during valve test cycle which is generally performed at least once a week in most power generating stations. However, valve testing as it is carried out in the prior art determines only whether the valve plug is free to move. Such testing does not predict if the valve is close to being stuck — that is, if the accumulation of deposits within the narrow clearance has not yet reached the point where the valve is completely stuck, but is accumulating wihin those clearances so that the point of sticking is near. During such inspections, of course, if a valve is found to be stuck, corrective action is taken immediately and forced outages usually result. However, if the valve has moved during the system test, no further action is taken, even though the accumulated deposits within the narrow clearances within the valve may be precipitously close to causing a stickage within a valve.

It is, of course, desirable to provide an apparatus and method for determining whether the friction level within a position modulated flow control valve is below a certain predetermined friction level. Such information is most useful in determining potential trouble spots before the valves become totally stuck; and, when such testing apparatus is associated within the overall computer-controlled valve control system, the information provided thereby is invaluable to the prevention of forced outages and the loss of power generation capability.

SUMMARY OF THE INVENTION

This invention provides a method and apparatus for determining the magnitude of friction forces generated within a flow control valve having a pressure actuator thereon. The invention includes means for generating a first signal proportional to the magnitude of the pressure actuating force necessary to displace the valve plug a predetermined distance in a predetermined direction, either toward the open or the seated position. Second means are provided for generating a second signal proportional to the magnitude of the pressure actuating force required in order to displace the valve plug a predetermined distance in a direction opposite to the first displacement direction. The first and second signals are utilized to generate a signal proportional to the difference therebetween, the differential proportional signal being functionally related to the magnitude of the friction force generated within the valve by the first and second displacements therein. Means are provided for comparing the magnitude of the friction force that is functionally related to the differential pressure signals with a predetermined reference value. If the magnitude of the friction force so detected exceeds the reference value, the probability of valve sticking is known to be high for the particular valve involved. The apparatus and method permit power generation personnel to ascertain whether control valves or other position modulated flow control devices within the power plant are close to being stuck although movement tests still indicate that the valves are movable.

It is an object of this invention to provide a method and apparatus for indicating whether friction levels within a position modulated control valve are approaching a potentially hazardous level. It is a further object of this invention to provide a method and an apparatus which indicates whether a position modulated flow control device, while still movable, is approaching a condition where frictional levels within the valve are likely to cause a stickage to occur. Other objects of the invention will become clear in the following description of the preferred embodiment which follows herein.

BRIEF DESCRIPTION OF THE DRAWINGS

The invention will be more fully understood from the following detailed description of the preferred embodiment taken in view of the accompanying drawing in which:

The FIGURE is an elevational view in section showing an apparatus for detecting the friction levels within the valve in accordance with the teachings of this invention.

DESCRIPTION OF THE PREFERRED EMBODIMENT

In the FIGURE is shown an elevational view, in section, of a position modulating flow control device having associated therewith an apparatus, generally indicated by reference numeral 10, for indicating whether the magnitude of frictional forces generated within a valve 12 exceeds a predetermined reference value.

The valve 12 generally comprises a casing 14 having an inlet port 16 and an outlet port 18 communicating with a valve chamber 20 defined on the interior of the casing 14. A valve plug 22 is mounted for reciprocal movement with a valve stem 24 which passes from the chamber 20 through an opening 26 having a predetermined clearance therebetween. A valve seat 28 extends circumferentially about the interior of the casing adjacent the outlet 18. The stem 24 is associated with a pressurized fluid actuator generally indicated by reference numeral 30. The actuator 30 includes a fluid-tight cylinder 32 in which is disposed a piston 34 having a first and a second operative surface area 36 and 38, respectively, thereon. The stem 24 extends into the cylinder 32 through an opening 40 and is connected to the piston 34. For purposes of discussion, the surface area 36 will be denominated as area $A_1$, the area 36 being on the bottom of the piston and the area to which the stem 24 is affixed. The second area 38 located on the top of the piston 34 will be denominated as area $A_2$. Fluid actuator ports 42 and 44 are supplied to both sides of the piston 34 so that actuatingfluid for the hydraulic operator 30 may be provided. As seen, the port 42 communicates with a chamber 46 defined by the lower surface 36 of the piston 34 and the interior of the cylinder 32, while the port 44 communicates with a chamber 48 defined by the upper surface 38 of the piston 34 and the interior of the cylinder 32.

A disc 50 is mounted to the stem 24 and acts as a spring retainer for a biasing spring 52. The springs 52 exerts a force tending to cause the plug 22 to be seated against the valve seat 28 to isolate the inlet ports 16 from the outlet port 18. It is to be understood that the foregoing description defines a typical pressure actuated position modulated valve of typical construction in the prior art except for apparatus 10, which will be described more fully herein.

As mentioned above, varying the location of the plug 22 with respect to the seat 28 varies the volume of fluid passed from the valve inlet 16 to the valve outlet 18. Such positioning is, in the normal situation, controlled by an electrical and hydraulic control system, usually controlled by a digital computer. The control system varies the position of the plug 22 with respect to the seat 28 by controlling the amount of hydraulic fluid permitted to enter chambers 46 and 48. As also stated above, the narrow clearances within the valve 12, such as those extant between the stem 24 and the opening 26, may become clogged with accumulated precipitates which generate frictional forces as the stem 24 moves with respect to the casing 14. Although the frictional forces may not yet be of a sufficient magnitude to prevent motion of the stem 24 with respect to the casing 14, it is advantageous to know whether the magnitude of the frictional forces so generated when the plug 22 moves to modulate flows are less than a predetermined frictional force. The method and apparatus embodying the teachings of this invention are provided so that an indication of whether the frictional forces generated within the valve 12 by motion of a movable portion thereof with respect to a stationary portion thereof generates a friction force that is less than a predetermined reference friction force.

The principles of operation on which the method and apparatus embodied within this invention rest follow directly from a force balance equation of the system hereinbefore described.

In order to move the plug 22 upward a predetermined distance, it is apparent that the control system must admit pressurized operating fluid through the port 42 into the chamber 46 which acts against the piston 34 to oppose the force of the spring 52 to increase the lift or dimension between the plug 22 and the seat 28. Thus, a force balance equation resulting from movement of the plug 22 a predetermined distance may be written. Utilizing the convention that forces acting upward as shown by the schematic reference at 54 will be positive, the following force balance may be given.

$$F_{a(up)} = P_{1(up)} \cdot A_1 - P_{2(up)} \cdot A_2 - F_s - F_m - F_w - F_f \qquad (1)$$

Equation (1) indicates that the force $F_{A(up)}$ required to accelerate mass of the moving parts of the valve and actuator upwardly is equal to the positive force of the pressure $P_1$ within the chamber 46 acting against area $A_1$ which produces a force $F_{1(up)}$ acting in the positive direction. Opposed to this is a force of the pressurized fluid having pressure $P_2$ within the chamber 48 and acting over an area $A_2$ to produce a force $F_{2(up)}$ acting in a negative direction. Also opposed to an upward movement of the plug 22 is the force of the spring $F_s$, a force $F_m$ due to the flow of media, such as steam, through the valve 10, a force $F_w$ due to the weight of the members moved, and of course, a force $F_f$ equal to the frictional force generated between the stationary member casing 14 and the stem 24 slidably disposed thereagainst.

Similarly, the force required for movement of the valve plug 22 downward relative to the seat 28 is expressed in the force balance equation shown in equation (2):

$$F_{a(down)} = P_{1(down)} \cdot A_1 - P_{2(down)} A_2 - F_s - F_m - F_w + F_f \qquad (2)$$

As seen from equation (2), the force $F_{a(down)}$ required to accelerate mass of the moving parts of the valve and the actuator downwardly is equal to thej pressure of the pressurized fluid within the chamber 48, $P_2$, acting downward on the area $A_2$ to produce a force, $F_{2(down)}$. Since the force, $F_{2(down)}$, similar to force $F_{2(up)}$, acts in a negative direction according to the convention 54, it is given a negative sign within equation (2). Opposing the downward movement of the plug 22 is the force $F_1$ down equal to the pressure $P_1$ within the chamber 46 down multiplied by the area $A_1$. The force of the spring $F_s$ assists the predetermined downward movement of the plug 22 relative to the seat 28, and according to the convention, therefore is depicted as a $-F_s$ in equation (2). Similarly, the force of the medium $F_m$ and the force of the weight of the members $F_w$ also assist in the downward movement and thus, according to convention 54, warrant minus signs as seen in the second equation. However, the force of the friction $F_f$ opposes the motion of the downward motion of the plug 22 for the predetermined distance relative to the seat 28, and therefore, according to the convention 54, has a plus sign in the second equation.

If the valve plug 22 is moved very slowly, both in the upward direction and in the downward direction, it is apparent that the force $F_{a(up)}$ will be equal to the force $F_{a(down)}$, both being approximately zero. Such a condition permits equality to be made between equation (1) and equation (2). Also, the force $F_m$ due to the media flowing through the valve would be zero if the valve is perfectly balanced. The term perfectly balanced means that the valve plug is so constructed that for any combination of plug lift and the media flowing therethrough, the forces on the plug are zero. Of course, valves need not be perfectly balanced for the invention herein disclosed to perform its stated function. Since the arrangement is such that for small movements of the plug (upward or downward) the force thereon is essentially constant, and, as such, will cancel. Assuming this to be the case for the purposes of our discussion, the terms $F_m$ may be set to zero. Further, since the weight of the members is the same in both movements, the force $F_w$ may be set to zero. Similarly, the force due to the springs $F_s$ is also equal in both movements. Thus, the results of the equality between the upward and downward acceleration forces yields:

$$P_{1(up)}A_1 - P_{2(up)}A_2 - F_f - P_{1(down)}A_1 - P_{2(down)}A_2 + F_f \quad (3)$$

From equation (3) it may be seen that:

$$[P_{1(up)} - P_{1(down)}]A_1 - [P_{2(up)} - P_{2(down)}]A_2 = 2F_f \quad (4)$$

Equation (4) itself yields:

$$F_f = \tfrac{1}{2}[(P_{1up} - P_{1down})A_1 - (P_{2up} - P_{2down})A_2] \quad (5)$$

If one side of the hydraulic operator 30 is connected to a constant pressure, for example, if the pressure within the chamber 48 were connected to drain, the difference between the pressures $P_{2(up)}$ and $P_{2(down)}$ would be approximately equal to zero. Thus, equation (5) degenerates to equation (6):

$$F_f = \tfrac{1}{2}A_1(P_{1up} - P_{1down}) \quad (6)$$

which indicates that the force of the friction is equal to $\tfrac{1}{2}$ of the area $A_1$ multiplied by the difference in pressure forces $P_{1(up)} - P_{1(down)}$. Thus, it may be understood that if the pressure force required within the actuator 30 to move the plug 22 upward with respect to the seat 28 is known, and similarly if the pressure force within the chamber 46 when the plug 22 is moved downward is known, the force of the friction within the valve 10 can be ascertained.

The method and apparatus 10 embodying the teachings of this invention make use of the physical principles described above. Provided is a pressure sensor element 60 located in a position so as to measure the pressure of fluid disposed within the chamber 46. The element 60 is adapted to generate a signal proportional to the pressure of the fluid within the chamber 46 when the plug 22 is moved upward relative to the seat 28. The sensor also generates a second signal proportional to the pressure within the chamber 46 when the plug 22 is moved downward relative to the seat 28. The sensor 60 is operatively connected to suitable means 62 for ascertaining the difference in signals between the pressure required to move the plug 22 upward the predetermined distance and the pressure within the chamber 46 when the plug 22 moves downward a predetermined distance. The means 62 generates a third signal proportional to the difference in pressures between the first and second signal produced by the detector sensor 60. As described above and as shown in the equation (6), the difference in pressures is proportional to the friction force within the valve 10.

The third signal produced by the means 62 is introduced to suitable comparator means 64 which compares the third signal (related functionally to the friction force within the valve 12) with a predetermined reference signal. If the third signal exceeds the reference signal, suitable indication may be made to show that the friction forces within the valve 12, although yet not sufficient to totally stop movement of the plug 22, are approaching a level wherein the valve is nearly stuck. Of course, if the friction force detected by the detector embodying the teachings of this invention is less than the predetermined reference value, such an indication may also be given. It is, of course, apparent that a control scheme embodying the teachings of this invention is adaptable for utilization within a computer control network. The computer through the disposition of suitable transducers can be appraised of the pressure within the hydraulic operator 30 and can measure the actual position of the plug 22.

It is to be noted that the predetermined distances through which the plug 22 is moved in the upward and downward directions need not necessarily be equal in order for the method and apparatus described herein to substantially accurately ascertain the friction force within the valve 12. However, it is also to be noted that the magnitude of the predetermined displacements must be within bounds set by the load conditions imposed on the power plant, the flow conditions extant through a particular valve 12 and other considerations engendered by the operating condition of the power plant. Thus, although the distances need not be equal, they cannot be unlimited and are bound by certain parameters which are well known to those skilled in the art, dependent upon the existence of particular operating conditions within the power plant system in which the valve 12 is disposed.

An alternative arrangement follows directly from equation (5). If the opposite side of the hydraulic operator is connected to a constant pressure, for example, if the pressure in chamber 46 is connected to drain, the difference between the pressures $P_{1(up)}$ and $P_{1(down)}$ would approximate zero. Therefore, equation (5) yields:

$$F_f = \tfrac{1}{2} A_2 (P_{2down} - P_{2up}) \quad (7)$$

It is understood that if the first chamber 46 is connected to a constant pressure source or to a drain, the value of the term $[P_{1(up)} - P_{1(down)}]$ in equation (5) would go to zero. Therefore, the force of the friction would be shown as dependent upon a constant, ½ of the area $A_2$ multiplied by the difference in pressure between the pressure within the chamber 48 when the valve moves downward and the pressure within the chamber 48 when the valve moves upward. Therefore, it is within the contemplation of this invention to provide a second detector 66 so as to monitor the pressure forces within the chamber 48 when the valve plug is moved downward the predetermined distance and the pressure within the chamber 48 when the valve plug is moved upward the predetermined distance.

Similar to that described in connection with detector 60, the first and second signals produced by the detector 66 corresponding to the downward and upward movements, respectively of the plug 22 are conducted to the means 62 which produces a fourth signal proportional to the difference between the first and second signals produced by the detector 66, and which is functionally related, as shown by equation (7), to the force of the friction within the valve 12. The fourth signal is conducted to the comparator 64 which compares the signal so produced to a predetermined reference and similar indications are given if the friction levels within the valve 10 are approaching the critical condition of being stuck.

The method for determining whether the friction level within the flow modulating control valve exceeds a predetermined frictional force would be, with the valve in a flow modulating position, to actuate the pressure actuator 40 to move the valve plug a predetermined distance in a predetermined direction. The magnitude of the distance moved is of course limited by the load conditions imposed upon the power plant in general, among other parameters. The pressure force of the actuator is monitored and recorded. The valve stem may be checked, such as through use of a linear variable differential transformer (LVDT) to ascertain that the plug has, in fact, moved. The valve is then moved downward a predetermined distance, not necessarily equal to the first predetermined distance, in a direction opposite to the first direction of displacement. Again, the magnitude of this displacement is dependent on load conditions and other system parameters. The pressure force required within the actuator 30 to move the valve the second predetermined distance is recorded. It may be desirable to again check, such as through an LVDT, that the stem has in fact moved the second predetermined distance in the second direction. Frictional force levels within the valve are then calculated and signals generated according to the description and equations derived above. The frictional force of the valve 12 so produced is compared with a reference value. This output may be printed or recorded for further use.

The absolute limit, in the case of equation (6), which idicates that the valve is in fact stuck, is of course directly ascertainable. If the force $P_{1(up)}$ is equal to the system supply pressure or, conversely, if the force $P_{1(down)}$ is equal to zero, it is clear that the valve is indeed stuck since this plug has not in fact moved. Similarly, with respect to equation (7), if the force of the pressure $P_{2(down)}$ is the system pressure, or if the pressure $P_{2(up)}$ is equal to zero, again one is assured that the plug is completely stuck and that it has not moved for any predetermined distance.

It may be thus appreciated that an apparatus and method for ascertaining whether the friction levels within a position modulated valve are approaching a critical friction value so as to indicate that the valve is approaching a stuck condition is embodied within the teachings of this invention.

I claim:

1. A method for determining if the magnitude of a friction force generated when relative motion is caused to occur between a stationary member and a member slidably disposed thereagainst in a friction-producing relationship is less than a predetermined magnitude, the method comprising the steps of:
   a. actuating a pressurized fluid actuator to displace said slidable member a first predetermined distance in a first predetermined direction,
   b. generating a first signal proportional to the magnitude of the pressure force required to displace said slidable member said first predetermined distance,
   c. actuating a pressurized fluid actuator to displace said slidable member a second predetermined distance in a second predetermined direction opposite to said first predetermined direction,
   d. generating a second signal proportional to the magnitude of the pressure force required to displace said slidable member said second predetermined distance,
   e. generating a third signal dependent upon the difference between said first and second signals and functionally related to the friction force between said slidable member and said stationary member, and,
   f. comparing said third signal to a predetermined reference signal functionally related to said predetermined magnitude of said friction force.

2. In a valve for modulating the flow of a fluid having a casing, an inlet and an outlet therein, a valve plug movable from open to seated position movably mounted relative to said casing on a valve stem, said stem extending through said casing and pressurized actuator means connected to the stem for moving the valve plug, wherein said improvement comprises a device for indicating whether the friction force generated between said valve stem and said casing exceeds a predetermined value, said device comprising:
   first means for generating a first signal proportional to the magnitude of a pressure force required by said actuator to move said stem a first predetermined distance in a first direction,
   second means for generating a second signal proportional to the magnitude of a pressure force required by said actuator to move said stem a second predetermined distance in a second direction opposite to said first direction,
   means for generating a third signal proportional to the difference between said first and second signals and functionally related to said friction force, and,
   means for comparing the third signal functionally related to the friction force to a predetermined reference signal.

3. The device of claim 2, wherein said actuator includes a movable abutment attached to said valve stem, said abutment dividing a casing in which it is disposed into a first chamber and a second chamber, and wherein,
   said first and said second means generates said first and said second signal by measuring the pressure force in said first chamber when said actuator moves said plug in said first and said second directions.

4. The device of claim 2, wherein said first and said second predetermined distances are less than the full travel distance of said plug.

* * * * *